United States Patent [19]

Radomski

[11] Patent Number: 4,882,515
[45] Date of Patent: Nov. 21, 1989

[54] ALTERNATING CURRENT GENERATOR

[75] Inventor: Thomas A. Radomski, Utica, Mich.

[73] Assignee: General Motors Corporation, Detroit, Mich.

[21] Appl. No.: 263,850

[22] Filed: Oct. 28, 1988

Related U.S. Application Data

[63] Continuation-in-part of Ser. No. 201,717, Jun. 3, 1988, abandoned.

[51] Int. Cl.$^4$ ............................................. H02K 19/22
[52] U.S. Cl. ..................................... 310/263; 310/168
[58] Field of Search ............... 310/156, 168, 263, 194, 310/261

[56]  References Cited

U.S. PATENT DOCUMENTS

| | | | |
|---|---|---|---|
| 2,796,542 | 6/1957 | Bekey et al. | 310/162 |
| 3,392,294 | 7/1968 | Campbell | 310/168 |
| 3,411,027 | 11/1968 | Rosenberg | 310/181 |
| 3,555,327 | 1/1971 | Terry | 310/168 |
| 3,571,639 | 3/1971 | Tiltins | 310/168 |
| 3,656,017 | 4/1972 | Inagaki et al. | 310/90 |
| 4,075,519 | 2/1978 | Mrcun | 310/67 R |
| 4,114,056 | 9/1978 | Nimura | 310/42 |
| 4,418,295 | 11/1983 | Shiga | 310/59 |
| 4,488,075 | 12/1984 | De Cesare | 310/156 |
| 4,584,496 | 4/1986 | Frister | 310/60 R |
| 4,588,915 | 5/1986 | Gold et al. | 310/194 |
| 4,686,399 | 8/1987 | Imori et al. | 310/62 |

FOREIGN PATENT DOCUMENTS 987882  1/1962  United Kingdom .

OTHER PUBLICATIONS

Advertising Brochure–41–DN Series Type 250 Generator, Delco Remy Division of General Motors, 1965.

Primary Examiner—Patrick R. Salce
Assistant Examiner—Judson H. Jones
Attorney, Agent, or Firm—C. R. Meland

[57]  ABSTRACT

An alternating current generator for supplying the electrical loads on a motor vehicle. The generator has a stator core that carries a three-phase stator or output winding. The rotor of the generator has two claw pole members that are so oriented that the fingers of the pole members are aligned. Disposed between the two pole members is a third pole member having projections disposed between the aligned fingers of the claw pole members. The rotor has two field coils which are so arranged and energized that the magnetic polarity of the two claw pole members is the same and opposite the magnetic polarity of the third pole member. One of the field coils can be replaced by a permanent magnet and when this is done the generator is provided with a magnetic circuit that can divert permanent magnet flux away from the stator core. Flux diversion is controlled by supplying unidirectional current to the field winding under the control of a voltage regulator.

4 Claims, 5 Drawing Sheets

ALTERNATING CURRENT GENERATOR

This application is a continuation-in-part of copending application Ser. No. 201,717, filed on June 3, 1988.

This invention relates to alternating current generators and more particularly to alternating current generators for supplying electrical power to the electrical loads on a motor vehicle including charging the vehicle storage battery.

Alternating current generators for supplying power to the electrical loads on a motor vehicle are well known, an example of which is the alternating current generator shown in the U.S. patent to Merrill et al. 4,604,538. The generator disclosed in that patent is a Lundell type machine and it has a claw-pole type of rotor.

One drawback of a Lundell machine is that geometrical constraints limit the operating efficiency. Essentially, distributing flux from a common core to the multiple claw pole fingers place a practical limit on the stator core lamination stack length to stator bore diameter ratio. This in turn causes the stator winding end connections to be typically 1.5 times longer than the active winding length which results in high copper losses and poor efficiency.

Because motor vehicles have ever increasing power demands, an alternator with greater electrical output, higher power to weight ratio and better conversion efficiency is needed.

In order to provide greater electrical output, alternators have been used that have a double claw pole type of rotor assembly. Such an alternator is disclosed in an advertising brochure that relates to a 41-DN SERIES/-TYPE 250 Generator of the Delco Remy Division of General Motors Corporation (Dec. 1965). That alternator has four claw tooth pole members and two field coils, all carried by a common shaft. A pair of pole members and one field coil form one rotor and the other pair of pole members and the other field coil form another rotor. Both rotors are disposed within a stator coil so that the voltage generated in the stator coil is a function of the sum of fluxes developed by the two field coils.

This invention, like the above-mentioned Delco Remy alternator, uses a double rotor construction. This invention differs from the Delco Remy alternator in that, among other things, one of the field coils is replaced by a permanent magnet. Further, this invention utilizes an arrangement of rotor parts that enables air gap flux reduction by diversion of the flux developed by the permanent magnet. The arrangement of rotor parts is such that air gap flux and iron losses can be reduced by diverting the permanent magnet flux within the rotor magnetic circuit.

It accordingly is an object of this invention to provide a new and improved alternating current generator wherein the rotor of the generator has a field coil and a permanent magnet and herein the magnetic parts of the rotor are arranged such that air gap flux between the rotor and stator can be controlled by variably diverting the flux developed by the permanent magnet away from the air gap between the rotor and stator. More specifically, the rotor of an alternator made in accordance with this invention is comprised of iron rotor parts that are arranged such that they form a closed iron path magnetic circuit that has no air gaps. This magnetic circuit is magnetically connected to opposite faces or ends of the permanent magnet and it bypasses the air gap between the rotor and stator. Further, the magnetomotive-force (mmf) developed by the ampere turns of the field coil and the arrangement of the magnetic parts of the rotor is such that the mmf developed by the field coil controls the amount of flux developed by the permanent magnet that is diverted through the closed iron path and, thus, controls the net air gap flux. By way of example, if no mmf is developed by the field coil (zero field current) the closed iron path magnetic circuit diverts substantially all of the flux developed by the permanent magnet away from the stator winding of the alternator with the result that substantially no voltage is induced in the stator winding. As field current is varied, the amount of flux developed by the permanent magnet that is diverted will vary. In accordance with this invention, unidirectional current of a varying magnitude is applied to the field coil by a voltage regulator that responds to the magnitude of the output voltage of the generator. The voltage regulator can be of a conventional type that is used with conventional alternating current generators that have a single field coil that forms the sole source of flux for the generator. Thus, I have discovered that by using a generator that has the flux diverting capability of the type that has been described, the output voltage of the generator can be regulated by a simple voltage regulator that supplies a variable magnitude unidirectional current to the field coil. Therefore, it is not necessary to reverse the field current through the field coil to provide generator voltage regulation.

IN THE DRAWINGS

Figure 1:
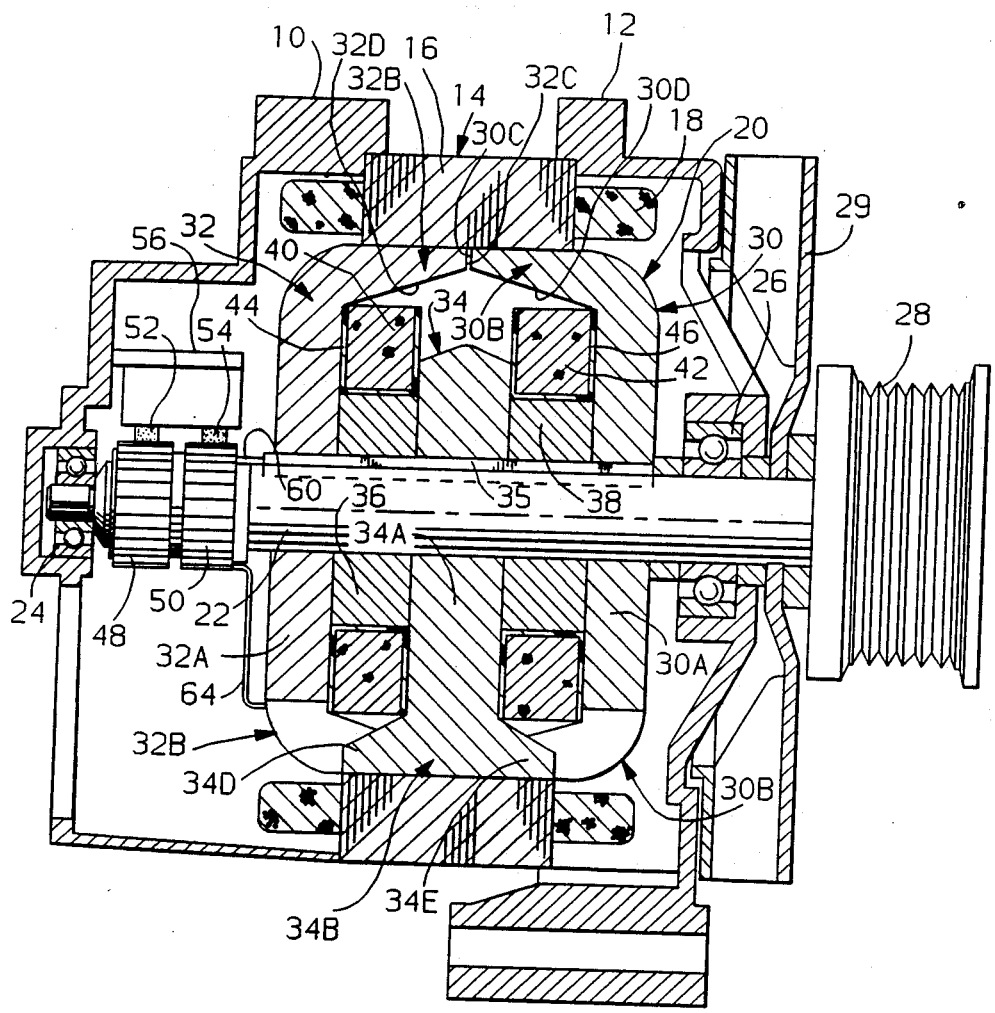
FIG. 1 is a sectional view of an alternating current generator.
Figure 8:
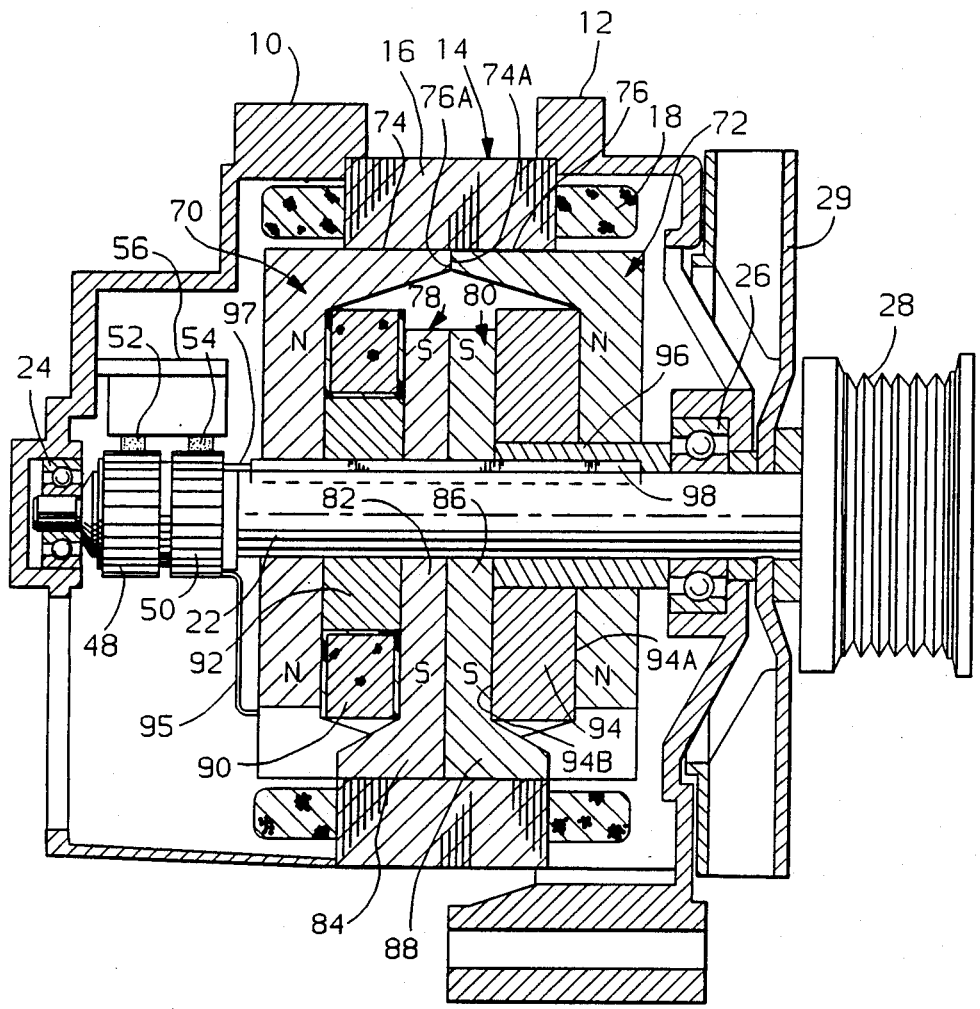
FIG. 8 is a sectional view of an alternating current generator where the rotor has one field coil and one permanent magnet.
Figure 10:
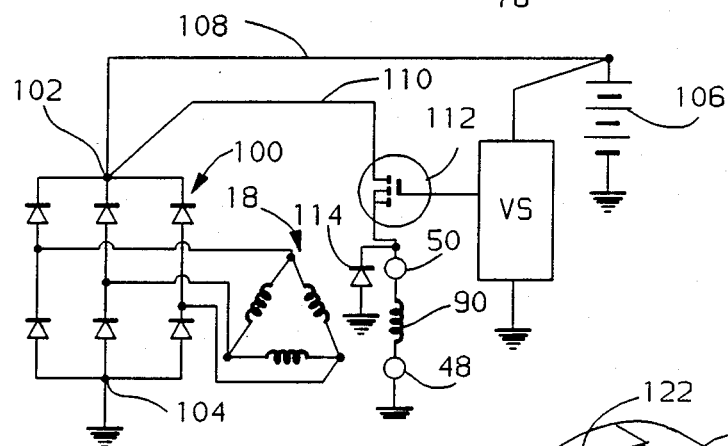
Figure 11:
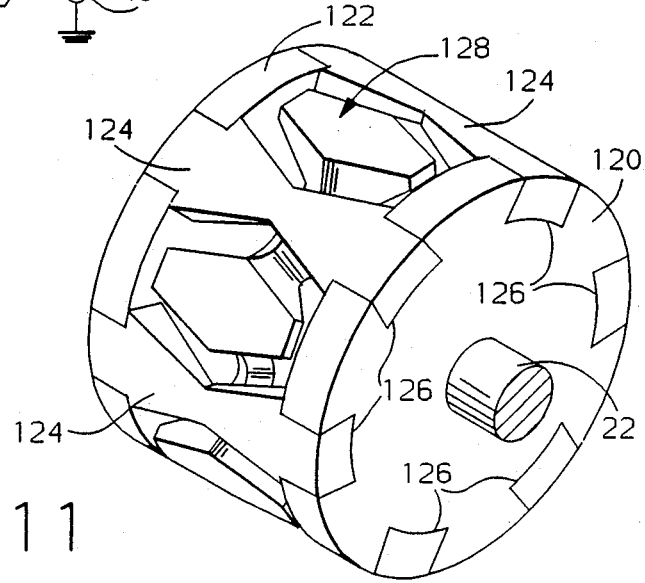

FIG. 10 is a circuit diagram of a voltage regulating arrangement for controlling the field current of the single field winding of the generator shown in FIG. 8; and FIG. 11 is a perspective view of a modified rotor that can be used in the generator shown in FIG. 8. Referring now to the drawings and more particularly to FIG. 1, the alternating current generator of this invention comprises metallic end frames 10 and 12 that support a stator assembly 14. These end frames are typically formed of aluminum. A plurality of through-bolts (not illustrated) are used in a known manner to secure the end frames together. The stator assembly 14 is comprised of a slotted stator core 16 formed of a stack of steel laminations that carries a three-phase stator or output winding 18. Portions of the stator winding 18 are located in the slots of stator core 16 as is well known to those skilled in the art.

The alternating current generator has a rotor generally designated by reference numeral 20. This rotor is comprised of a shaft 22 that is supported for rotation by bearings 24 and 26. A pulley 28 is connected to shaft 22 and a cooling fan 29 is secured to the shaft.

The rotor 20 further comprises claw pole members 30 and 32 and a central pole member 34 all of which are secured to shaft 22 to rotate therewith by key 35. Pole members 30, 32 and 34 are all formed of a magnetic material such as steel. Disposed between and engaging pole members 32 and 34 is an annular steel core member 36 that is secured to shaft 22 by key 35. The rotor has another steel core member 38 that is disposed between and in engagement with pole members 30 and 34 that is likewise secured to shaft 22 by key 35.

The core members 36 and 38 respectively support field coils 40 and 42 that are carried by spools 44 and 46 that are formed of insulating material. Alternatively, the spools may be of magnetic material such as steel suitably insulated as is well known to those skilled in the art. The field coils 40 and 42 have the same number of turns. The spools and field coils form parts of the rotor and rotate relative to the stator whenever the rotor is rotated.

The rotor shaft 22 carries metallic slip rings 48 and 50 that are electrically insulated from each other and from shaft 22. The slip rings are engaged by brushes 52 and 54 that are supported by brush holder 56.

Figure 3:
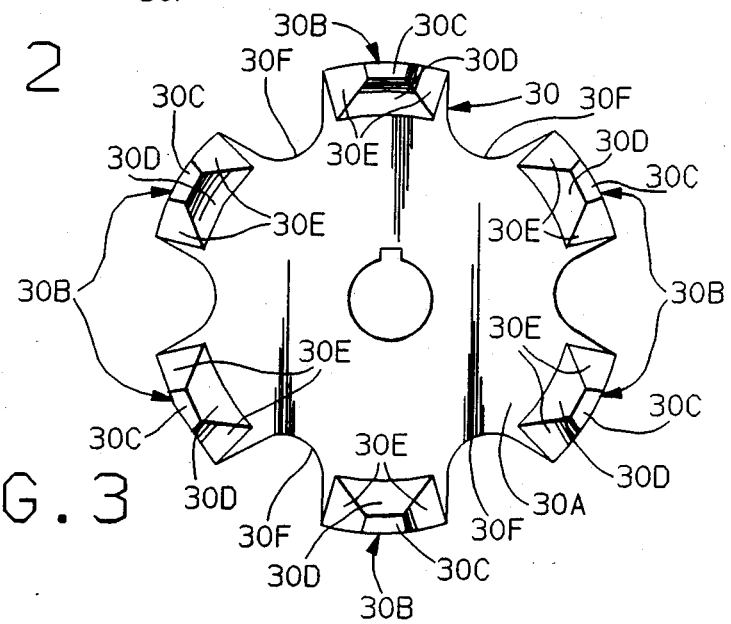
FIG. 3 is an end view of a claw pole member that is a component of the rotor of the generator shown in FIG. 1.

The rotor pole members 30 and 32 are identical and an end view of rotor claw pole member 30 is shown in FIG. 3. As shown in FIG. 3, pole member 30 comprises a disk portion 30A and six circumferentially spaced and axially extending pole fingers 30B. Each pole finger 30B has an end surface 30C, an inner surface 30D and slanted side surfaces 30E. The surfaces 30E taper radially and axially inwardly. The pole fingers 30B are separated by notches 30F. It will be appreciated that more or less than six pole fingers could be used.

As previously mentioned, rotor claw pole member 32 is identical with claw pole member 30. It has a disk portion 32A and six pole fingers 32B. Each pole finger 32B has an end surface 32C, an inner surface 32D and slanted side surfaces 32E. The pole fingers 32B are separated by notches 32F.

Figure 4:
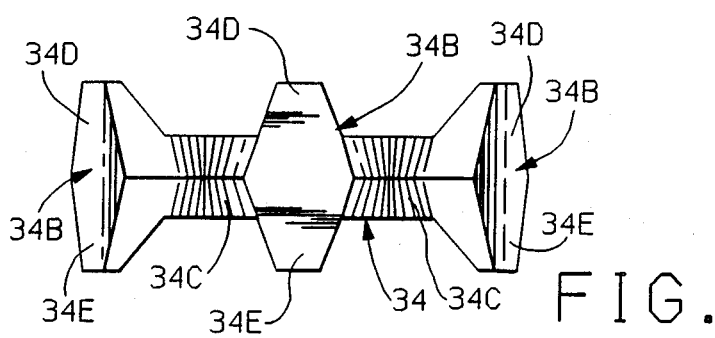
FIG. 4 is a view of the central pole member that is a component of the rotor of the generator shown in FIG. 1 looking in the direction of arrow 4—4 of FIG. 5.
Figure 5:
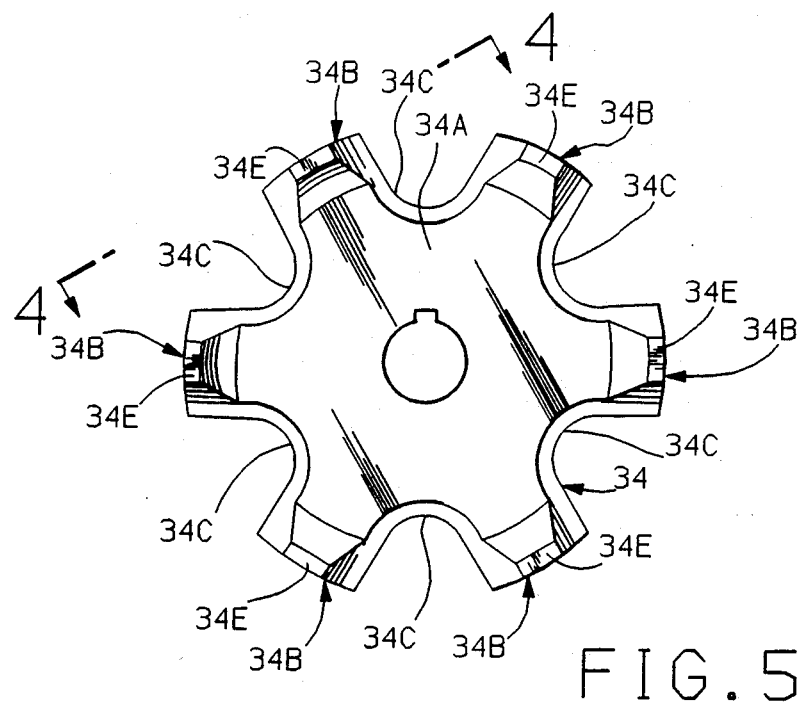
FIG. 5 is a plan view of the central pole member.

The center pole member 34, as shown in FIGS. 1, 4 and 5, has a disk portion 34A and six circumferentially spaced pole projections, each designated as 34B. The pole projections 34B are separated by notches 34C. Each projection 34B has oppositely directed portions 34D and 34E which are shaped to fit between pole fingers 30B and 32B of claw pole members 30 and 32.

Figure 2:
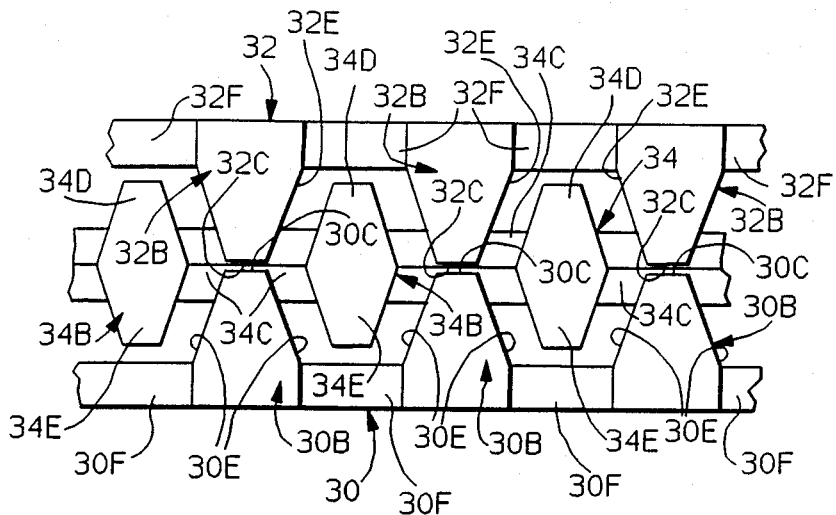
FIG. 2 is a developed view of the rotor of the generator shown in FIG. 1.

It can be seen in FIG. 2 that claw pole members 30 and 32 are so arranged relative to shaft 22 that pole fingers 30B and 32B are in exact alignment. In FIG. 2, there is a slight space shown between the end surfaces of pole fingers 30B and 32B; that is, end surfaces 30C are slightly spaced from corresponding end surfaces 32C of pole fingers 32B. If desired, these end surfaces may be engaged and in general any space between these end surfaces will depend on the axial stack-up of the parts that form the rotor. If the parts are all properly dimensioned, the end surfaces of pole fingers 30B and 32B will be engaged after the parts of the rotor are assembled.

It can be seen that the pole fingers 30B and 32B extend through the notches 34C of center pole member 34.

Figure 6:
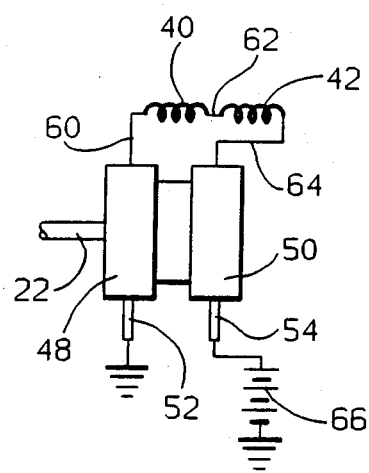
FIGS. 6 and 7 illustrate electrical connections for the field coils of the rotor of the generator shown in FIG. 1.

FIG. 6 illustrates one manner of electrically connecting the field coils 40 and 42 to each other and to a source of direct voltage. In FIG. 6, the same reference numerals have been used as were used in FIG. 1 to identify corresponding parts. The slip ring 48 is connected to one side of field coil 40 by conductor 60. The opposite side or end of field coil 40 is connected to one side or end of field coil 42 by a conductor 62. The opposite end or side of field coil 42 is connected to conductor 64 which in turn is connected to slip ring 50. The conductor 62 has not been illustrated in FIG. 1 nor has the entire extent of conductor 64 been illustrated. These conductors may pass through suitable bores or slots formed in the rotor parts.

In FIG. 6, brush 54 is shown connected to the positive terminal of a direct voltage source 66 which is shown as a battery. Brush 52 is connected to ground as is the negative terminal of battery 66. In a motor vehicle application the generator of this invention would be connected to a bridge rectifier which in turn would supply charging current to the battery. Moreover, the current supplied to the series connected field coils 40 and 42 would be controlled by a voltage regulator in a known manner.

When field coils 40 and 42 are energized with direct current they will develop magnetic flux which links the stator core 16 and the active conductors of the stator winding 18 located in the slots of the stator core to cause a voltage to be induced in winding 18. The field coils 40 and 42 are so wound and so connected to each other that when they are energized with direct current the flux developed by the field coils causes claw pole members 30 and 32 to have one magnetic polarity and central pole member 34 to have an opposite magnetic polarity. By way of example, if claw pole members 30 and 32 have a north magnetic polarity, central pole member 34 would have a south magnetic polarity. If claw pole members 30 and 32 had a south magnetic polarity, central pole member 34 would have a north magnetic polarity.

The operation of the alternating current generator of this invention will now be described. Let it be assumed that the rotor 20 is being driven and that field coils 40 and 42 are energized with direct current. Let it further be assumed that claw pole members 30 and 32 have a north polarity and the central pole member 34 has a south polarity. The flux generated by field coil 42 will flow through a path or magnetic circuit that includes core member 38, the disk portion 30A of claw pole member 30 to pole fingers 30B, through the air gap between pole fingers 30B and stator core 16 radially and then circumferentially through stator core 16, radially through core 16 and then through the air gap between stator core 16 and pole projections 34B and then through disk portion 34A of pole member 34 to core member 38. In a similar fashion, the flux developed by field coil 40 flows through core 36, the disk portion 32A of pole member 32 to pole fingers 32B, through the air gap between pole fingers 32B and stator core 16, radially and then circumferentially through stator core 16, radially through core 16 and then through the air gap between stator core 16 and pole projections 34B and then through disk portion 34A of pole member 34 to core member 36.

From the description of the flux paths it will be apparent that the flux generated by field coils 40 and 42 flows in the same direction through stator core 16. Accordingly, the voltage induced or generated in the conductors of stator winding 18 that are located in the slots of stator core 16 will be a function of the magnitude of the flux developed by field coil 40 added to the magnitude of the flux developed by field coil 42.

Figure 7:
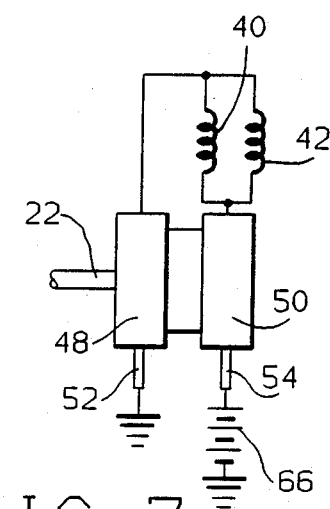

FIG. 7 illustrates a modified arrangement for energizing field coils 40 and 42 to produce the same relative magnetic polarities for the rotor 20 that have been described. In Figure 7, field coils 40 and 42 are connected in parallel and are energized by direct voltage source 66. The field coils 40 and 42 are so wound that they produce magnetic fields that will cause the magnetic polarity of claw pole members 30 and 32 to be the same but different from the magnetic polarity of central pole member 34.

In summary, it will be appreciated that when rotor 20 is being driven and when field coils 40 and 42 are energized with direct current, an alternating voltage will be induced in stator winding 18. The magnitude of this voltage will be a function of the speed of rotation of rotor 20 and the amount of flux developed by field coil 40 added to the amount of flux developed by field coil 42.

Referring now to FIG. 8, a modified alternating current generator is illustrated. This generator differs from the generator shown in FIG. 1 in that, among other things, one of the field coils has been replaced by a permanent magnet. The generator of FIG. 8 uses similar parts as the generator shown in FIG. 1 and corresponding parts in FIGS. 1 and 8 have been identified by the same reference numeral.

Figure 9:
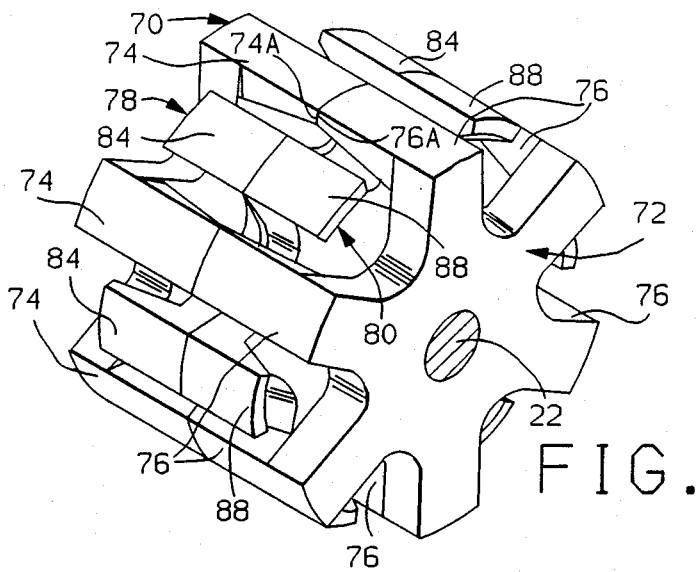
FIG. 9 is a perspective view of a rotor that is used in the generator shown in FIG. 8.

The rotor of the generator shown in FIG. 8 comprises steel pole members 70 and 72 which are also shown in FIG. 9. The pole member 70 has six axially extending and circumferentially spaced pole fingers 74 and the pole member 72 has six axially extending and circumferentially spaced pole fingers 76. The pole fingers 74 and 76 are exactly aligned with each other and the end faces 74A of fingers 74 tightly engage the end faces 76A of pole fingers 76. It is important that the end faces 74A and 76A be tightly engaged with no air gap between these end faces.

The rotor further comprises steel pole members 78 and 80. Pole member 78 has a disk portion 82 and six axially extending and circumferentially spaced pole fingers 84. Pole member 80 has a disk portion 86 and six axially extending and circumferentially spaced pole fingers 88. The disk portions 82 and 86 are tightly engaged, as shown in FIG. 8. The pole fingers 84 and 88 are exactly aligned with each other. Pole fingers 84 are disposed between pole fingers 74 and pole fingers 88 are disposed between pole fingers 76.

The rotor of the generator, shown in FIG. 8, has a field coil 90 that is disposed about steel core 92. This field coil is located between pole member 70 and disk portion 82 of pole member 78. An annular permanent magnet 94 is located between pole member 72 and disk portion 86 of pole member 80. The permanent magnet 94 is magnetized such that opposite end faces 94A and 94B have opposite magnetic polarities. For the purpose of explaining this invention it will be assumed that end face 94A is a north pole N and that end face 94B is a south pole S. One side of field coil 90 is connected to slip ring 50 by conductor 95 and the opposite side of field coil 90 is connected to slip ring 48 by conductor 97.

Disposed within pole member 72 and permanent magnet 94 is a nonmagnetic sleeve 96 that may be formed of a plastic material or a nonmagnetic stainless steel. This nonmagnetic sleeve prevents magnetic short circuiting of permanent magnet 94 by shaft 22 and disk portion 86 of pole member 80.

The various rotor parts are connected to shaft 22 by a key 98.

The field coil 90 is energized with unidirectional current by a voltage regulating arrangement that is shown in FIG. 10. In FIG. 10, output winding 18 is shown as being Delta-connected but it could be Y-connected if so desired. The stator or output winding 18 is connected to a three-phase, full-wave bridge rectifier 100 having a positive direct voltage output terminal 102 and a grounded negative direct voltage output terminal 104. The positive terminal 102 is connected to the positive terminal of storage battery 106 by line 108.

Unidirectional current is supplied to field winding 90 by line 110 and a field effect transistor 112 which forms a part of a conventional generator voltage regulator. The drain of transistor 112 is connected to line 110 and its source is connected to one side of field winding 90 through slip ring 50. The opposite side of field winding 90 is grounded through slip ring 48 and a field discharge diode 114 is connected across field winding 90. The gate of transistor 112 is connected to a voltage sensing circuit identified as VS. The voltage sensing circuit is connected between the positive side of battery 106 and ground and it accordingly senses the voltage across battery 106. The voltage regulator is of the type disclosed in the United States patent to Bowman et al. 4,636,706. When the voltage between conductor 108 and ground is above the desired regulated value, the voltage sensing circuit VS causes transistor 112 to be shut-off or nonconductive to out-off field current to field winding 90. When the voltage between line 108 and ground is below the desired regulated value, the transistor 112 is pulse-width modulated on and off that provides a field current that tends to increase the voltage on line 108 toward the desired regulated value. When the voltage on line 108 increases to a level where it exceeds the desired regulated value, transistor 112 shuts off. The pulse-width modulated control of field current is explained in above-referenced patent 4,636,706.

The field coil 90 is so wound and the direction of the current flow therethrough is such that disk portion 82 has a south S magnetic polarity and the pole member 70 has a north N magnetic polarity. This is under the assumption that permanent magnet 94 has the magnetic polarity described above. It accordingly is seen that pole members 70 and 72 have a magnetic polarity (north) that is opposite to the magnetic polarity of pole members 78 and 80 (south).

When no current is supplied to field coil 90, the flux developed by permanent magnet 94 will flow from its north pole (face 94A) to its south pole (face 94B) in a path that is made up entirely of steel or iron with no air gaps in this path. This path is from face 94A of magnet 94 to pole fingers 76, through abutting pole fingers 76 and 74 to pole core 92 and then through pole core 92 and disk portions 82 and 86 to face 94B of magnet 94. Thus, the flux developed by the permanent magnet is retained within the rotor and does not link the output winding 18 except for a small quantity of magnetic leakage flux. Accordingly, the voltage induced in stator winding 18 is small. The flux path that has been described can be considered as diverting or shunting the permanent magnet flux away from the air gap between the rotor and stator core 16. In this regard, only leakage flux exists between pole fingers 76 and 88 via stator core 16 because this path has been in effect magnetically short-circuited or shunted. Since pole fingers 76 and 74 form a shunt magnetic path, their cross-sectional areas are sized such that they are large enough to carry the permanent magnet flux.

Assume now that field coil 90 is energized. With the polarities of the permanent magnet and field coil, as has been described, abutting pole fingers 76 and 74 have the same magnetic polarity (north). Accordingly, the flow of permanent magnet flux through abutting pole fingers 76 and 74 is determined by the mmf developed by field coil 90. In regard to the development of an mmf by field coil 90, it will be appreciated that the mmf between pole fingers 74 and 84 varies as field current is varied and is zero with no field current. This said mmf determines the flux that flows through a path that includes pole fingers 74 through the air gap to stator core 16, through the air gap between stator core 16 and pole fingers 84 and then from pole fingers 84 through disk portion 82 and pole core 92. Permanent magnet flux flows in two paths: one path, which diverts flux from the air gap between the rotor and stator is through abutted pole fingers 76 and 74. The other path is from pole fingers 76 to stator core 16, through stator core 16 to pole fingers 88 and then through disk portion 86. From what has been described, it will be apparent that fluxes developed by the permanent magnet and by the field coil both link stator output winding 18 so that both fluxes now serve to cause a voltage to be induced in winding 18. The amount of permanent magnet flux that is diverted away from the stator core 16 depends on the amount of mmf developed by field coil 90. When there is no current supplied to field coil 90 all of the permanent magnet flux except for leakage is diverted away from stator core 16 because it flows through the previously described closed iron path, including abutting pole fingers 76 and 74. As field coil 90 is energized, less permanent magnet flux is diverted away from stator core 16. The amount of permanent magnet flux that is diverted away from stator core 16 will depend upon the magnitude of the mmf developed by field coil 90 which in turn depends upon the magnitude of field current supplied to field coil 90. At some intermediate level of field coil mmf none of the flux developed by permanent magnet 94 is diverted away from stator core 16. As field coil mmf is further increased, all the permanent magnet flux plus field coil flux, less leakage, is delivered to stator core 16. Thus, the total air gap flux can be controlled from some near zero minimum to some maximum design value. In a practical application, the system may be configured such that at maximum field current, the total useful flux that links output winding 18 can be made up of 40% permanent magnet flux and 60% field coil flux.

It will be appreciated that the output voltage of output winding 18 can be maintained at a desired regulated value by the simple voltage regulating arrangement shown in FIG. 10 which supplies unidirectional current to field winding 90. Thus, when the output voltage of output winding 18 is below the desired regulated value, field current is increased. A field current increase has a two-fold effect in increasing generator output voltage; that is, it causes less permanent flux to be diverted away from stator core 16 and it causes an increased field coil flux to link output winding 18 due to increased field current. When the output voltage of output winding 18 exceeds the desired regulated value, field current is reduced which reduces air gap flux. By using the generator structure of FIG. 8, which is capable of variably diverting permanent flux away from stator core 16 the simple voltage regulating arrangement shown in FIG. 10, can regulate the output voltage of the generator. There is no need to reverse the direction of current flow through field coil 90 to regulate the output voltage of the generator. Regulation is accomplished by supplying a variable unidirectional current to field winding 90. The shape of the pole fingers 76 and 74 differs to some extent from the shape of the pole fingers of pole members 30 and 32 which are used in the generator shown in FIG. 1. Pole members, like pole members 30 and 32, can be used to form the rotor shown in FIG. 8. The ends of the pole fingers must be tightly engaged and the cross-sectional area of the pole fingers that are engaged must be large enough to carry the permanent magnet flux that passes between engaged pairs of pole fingers.

Pole members 78 and 80 form, in effect, a single central pole member. Accordingly, instead of using two pole members 78 and 80, a single pole member, like pole member 34 (FIG. 4), could be used as part of the rotor of the FIG. 8 generator.

FIG. 11 illustrates the outer configuration of a rotor that could be used in place of the rotors of the generators shown in FIGS. 1 and 8. The FIG. 11 rotor has identical disk-shaped steel end members 120 and 122. These members are connected by six one-piece steel pole fingers, each designated as 124. The ends of the pole fingers 124 are located in dovetail slots 126 formed respectively in disks 120 and 122. The ends of pole fingers 124 are either press fit or welded respectively to disks 120 and 122.

The rotor of FIG. 11 has a central pole member 128 which is the same as the central pole member 34 shown in FIG. 4.

The FIG. 11 rotor configuration can be used with two field coils, like the rotor of the FIG. 1 generator, or can be used with one permanent magnet and one field coil, like the rotor of the FIG. 8 generator. When used with one permanent magnet and one field coil, the pole fingers 124 perform the same function as the abutted pole fingers 76 and 74 of the generator shown in FIG. 8.

The rotor shown in FIGS. 8 and 9 uses one permanent magnet and one field coil. To increase output power, two axially spaced rotors can be mounted on a common shaft, where each rotor is like the rotor shown in FIGS. 8 and 9. This requires two permanent magnets and two field coils and eight claw pole members.

The embodiments of the invention in which an exclusive property or privilege is claimed are defined as follows:

1. A voltage regulated alternating current generator comprising, frame means, a stator supported by said frame means comprising a stator core formed of magnetic material that has slots, an output winding carried by said stator core including conductors disposed within said slots, a rotor supported for rotation by said frame means disposed within said stator core, said rotor comprising a shaft, first and second claw pole members formed of magnetic material carried by said shaft, each pole member having a plurality of circumferentially spaced and axially extending pole fingers, the number of fingers of said first pole member being equal to the number of fingers of said second pole member, said first and second pole members being so oriented on said shaft that the pole fingers of said first and second pole members are aligned with each other, said first and second pole fingers being connected in such a manner that they magnetically connect said first and second pole members through the magnetic material of said first and second pole fingers, the outer periphery of the pole fingers of said first and second pole members being aligned with portions of the inner surface of said stator core, a third pole member means formed of magnetic material carried by said shaft having circumferentially spaced pole projections, said third pole means having disk portion means disposed between said first and second pole members, the projections of said third pole member means being disposed between the fingers of said first and second pole members, a field coil located between said first pole member and said third pole member means, a permanent magnet having opposed end faces of opposite magnetic polarity located between said third pole member means and said second pole member, said field coil being so wound and electrically connected and the end faces of said permanent magnet being so magnetically poled that when said field coil is energized with direct current the pole fingers of said first and second pole members have the same magnetic polarity and the pole projections of said third pole member means has an opposite magnetic polarity whereby the fluxes developed respectively by said field coil and permanent magnet that traverses said stator core is additive, means including said disk portion means and said connected first and second pole fingers defining a closed magnetic circuit formed entirely of magnetic material that magnetically connects said opposed end faces of said permanent magnet, said magnetic circuit shunting the air gap between said rotor and stator core whereby the flux developed by said permanent magnet is diverted from said air gap by said magnetic circuit and only leakage flux developed by said permanent magnet traverses said stator core when said field coil is not energized, the magneto-motive-force developed by said field coil when energized causing the flux developed by said permanent magnet that is diverted through said magnetic circuit to be reduced whereby flux developed by said permanent magnet that traverses the air gap between said rotor and stator increases, and voltage regulating means for maintaining the output voltage of said generator at a desired regulated value, said regulating means applying direct field current to said field winding in only one direction through said field winding, said regulating means including means for varying the magnitude of said direct field current as an inverse function of the output voltage of said generator, the amount of flux developed by said permanent magnet that is diverted through said magnetic circuit decreasing as said field current increases and increasing as said field current decreases.

2. The alternating current generator according to claim 1 where said third pole member means is comprised of a pair of pole members having engaged disk portions, each pole member having pole projections that extend in opposite directions.

3. The alternating current generator according to claim 1 where the connection between said first and second pole fingers is accomplished by engaged end faces of said first and second pole fingers.

4. The alternating current generator according to claim 1 where said first and second pole fingers are defined by a one-piece part formed of magnetic material that is connected between said first and second pole members.

* * * * *